United States Patent
Naylor

(10) Patent No.: US 7,197,627 B1
(45) Date of Patent: Mar. 27, 2007

(54) MULTIPLE PROCESSOR ARRANGEMENT FOR CONSERVING POWER

(75) Inventor: Rowan Nigel Naylor, Basingstoke (GB)

(73) Assignee: Telefonaktoebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/830,719

(22) PCT Filed: Oct. 25, 1999

(86) PCT No.: PCT/EP99/08058

§ 371 (c)(1),
(2), (4) Date: Aug. 1, 2001

(87) PCT Pub. No.: WO00/26772

PCT Pub. Date: May 11, 2000

(30) Foreign Application Priority Data

Oct. 30, 1998 (GB) .................................. 9823819.9

(51) Int. Cl.
*G06F 15/16* (2006.01)
(52) U.S. Cl. ............................ 712/34; 712/40; 712/43; 712/229; 713/323
(58) Field of Classification Search ................. 712/34, 712/32, 43, 35, 38–42, 228, 229; 713/300, 713/320, 323, 324
See application file for complete search history.

(56) References Cited

U.S. PATENT DOCUMENTS

| 5,021,991 | A | * | 6/1991 | MacGregor et al. ........ 710/305 |
| 5,226,127 | A | * | 7/1993 | Fu et al. ...................... 712/237 |
| 5,283,881 | A | | 2/1994 | Martini et al. |
| 5,495,588 | A | | 2/1996 | Gibart et al. |
| 5,614,847 | A | * | 3/1997 | Kawahara et al. ............. 326/98 |

FOREIGN PATENT DOCUMENTS

| EP | 0 174 231 A1 | 3/1986 |
| EP | 0 174 231 B1 | 3/1986 |
| GB | 1 576 276 | 10/1980 |

OTHER PUBLICATIONS

International Search Report as completed by the ISA/EP on Jan. 31, 2000 in connection with International Patent Application No. PCT/EP99/08058 as mailed Feb. 4, 2000.

* cited by examiner

*Primary Examiner*—Fritz Fleming
*Assistant Examiner*—Tonia L. Meonske
(74) *Attorney, Agent, or Firm*—Michael Cameron, Esq.

(57) ABSTRACT

A processing arrangement for a computer comprising: first processor means (1) for processing a first set of instructions; and second processor means (2) for processing a second set of instructions, the second set of instructions being a subset of the first set of instructions, wherein the second processor means (2) is arranged to receive control signals and to process instructions in dependence upon those control signals without reference to the first processor means.

12 Claims, 3 Drawing Sheets

MULTIPLE PROCESSOR ARRANGEMENT FOR CONSERVING POWER

The present invention relates to processing arrangements for computer architectures.

DESCRIPTION OF THE RELATED ART

There are many conventional computer architectures which are based on a single main processor cooperating with a co-processor. The co-processor adds functionality that the main processor in the architecture does not have or does not perform particularly efficiently. The co-processor generally uses instructions which are not implemented in the instruction set of the main processor. As such, many co-processors are used to address very specific code requirements, for example floating point arithmetic or signal processing. In most applications, this means that the instruction set of the co-processor is specific to that co-processor.

In addition, many main processors use real time operating systems to service multiple tasks and exceptions, such as interrupts. Servicing multiple tasks can result in context changes which can absorb significant amounts of the processing power available in the processor. A context change occurs when the task being executed by a processor is changed. The context of a task relates to the code corresponding to the task, and the state of the internal registers of the processor. Furthermore, in low power applications, in order to conserve power, sleep modes are used from which the processor must be reactivated when interrupt or service requests occur. When the processor is reactivated the context must be loaded and then the service performed, the processor then returns to an inactive state. Such a process can consume a large amount of power.

It is therefore desirable to provide a computer architecture which can overcome these disadvantages.

SUMMARY OF THE PRESENT INVENTION

According to one aspect of the present invention there is provided a processing arrangement for a computer comprising:

first processor means for processing a first set of instructions; and second processor means for processing a second set of instructions, the second set of instructions being a subset of the first set of instructions, wherein the second processor means is arranged to receive control signals and to process instructions in dependence upon those control signals without reference to the first processor means.

DETAILED DESCRIPTION OF THE PREFERRED EMBODIMENTS

Figure 1:
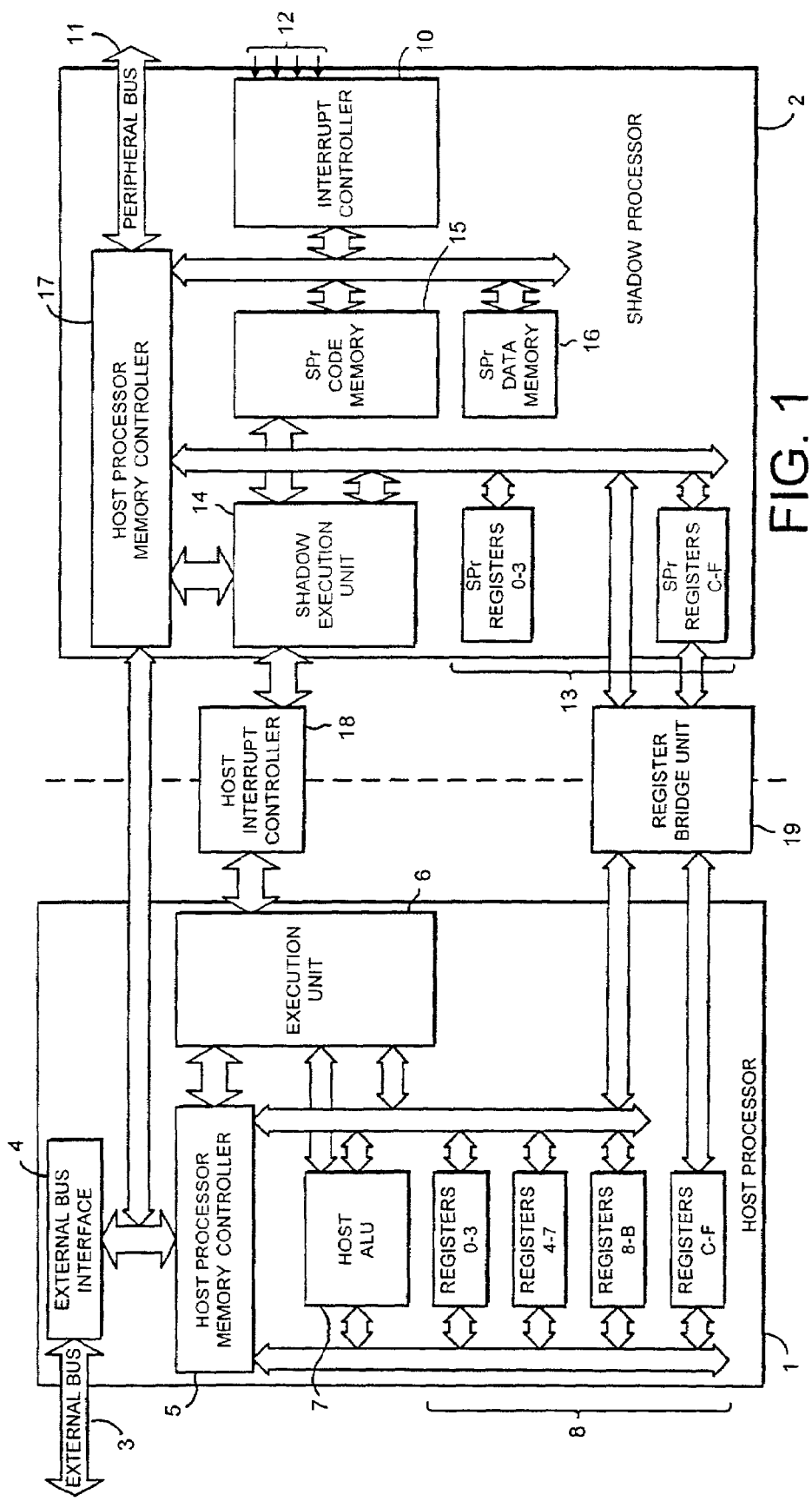
FIG. 1 is a block diagram illustrating a computer processor architecture in accordance with the present invention.

FIG. 1 shows a block diagram illustrating a host (or first) processor 1 connected with a shadow (or second) processor 2. In the example shown, the shadow processor 2 is used to control interrupts received from peripherals connected to the processor system.

The host processor 1 communicates with an external bus 3 by way of an external bus interface 4. The external bus 3 is used for transferring data to and from the main processor and memory devices (not shown). The host processor 1 also includes a memory controller 5 for controlling data access with memory devices. The memory controller 5 is controlled itself by an execution unit 6 which has overall control of the main processor 1. The host processor 1 also include an arithmetic logic unit (ALU) 7 and a number of registers 8, sixteen in the example shown. The various components of the host processor 1 communicate with each other by way of appropriate internal buses.

In order that the host processor 1 can be held in a low power inactive mode for as long as possible, a shadow processor 2 is connected to the main processor 1. The shadow processor 2 includes an interrupt controller 10 which receives interrupt signals via interrupt inputs 12. The shadow processor also includes registers which correspond to selected ones of the registers of the host processor 1. The interrupt controller can be connected, as in the example of FIG. 1, to peripherals connected to a peripheral bus 11.

The shadow processor 2 also includes an execution unit 14, code memory 15, and data memory 16. The shadow processor 2 operates to process a selected subset of the instructions from which the host processor operates, and these instructions are stored in the code memory 15. The shadow processor 2 has access to the host processor memory by way of a memory controller 17 which interfaces with the external bus 3 by way of the host external bus interface 4.

In order to provide a link between the host processor 1 and the shadow processor 2, the execution units of the two processors are connected by way of a host interrupt controller 18, and the registers of the processors are connected by a register bridge unit 19. The Host Interrupt Controller 18 is a module which allows the shadow processor to issue an interrupt to the host processor in order to cause a change in task execution, a context change, appropriate to the requirements of the system. It generates an interrupt to the host using the host interrupt protocol and indicating the source of the interrupt as a vector programmed by the shadow process related to the new task required.

The following description, of the process used to service an interrupt received from a peripheral bus 11 is one example of the operation of the shadow processor 2. A peripheral (not shown) raises an interrupt request on the interrupt input lines 12. The input controller 10 operates to interpret the interrupt request, and if the interrupt request is of the type able to be processed by the shadow processor 2, then the shadow processor 2 will service that interrupt. An example of an interrupt is if an external device such as a serial port has received data from a system to which it is attached. The data from such a serial port may be contained within a message body including information about the source and content of the data. The shadow processor 2 then services the interrupts required by receiving the message then removing the data from that message. Once the data has been removed and checked it issues an interrupt to the main processor 1 via the Host Interrupt Contoller 18 having first set up the context needed by the task to service the data within the message. The main processor 1 would begin processing the data while the shadow processor 2 stores the context of the interrupted task.

The Register Bridge unit 19 allows multiple access to a set of registers by both host and shadow processor. It allows physical registers to appear in both processor systems while resolving any conflict in their access and mapping of those registers within the physical resource space of the processors.

This unit contains multiplexers to allow dual access to either processor buses, arbitration logic to prevent access conflict, and logic to allow access addresses to be altered to allow re-mapping of the location of the registers in the address map of either processor.

For example registers mapped to positions 4–7 in the host may appear also in positions 4–7 in the shadow or be re-mapped to 8–11 of the shadow. Or in the case of register swapping, registers x-y of the host may be exchanged for equivalent registers in the shadow and vice-versa. This allows registers x-y of the shadow to be loaded with a new context then swapped in to the host in a context change. The registers replaced in the shadow would contain the old host context and can be stored or re-stored by the shadow while the host is processing the new context.

While the host processor 1 is processing a task or is in an unactive ("sleep") mode, the shadow processor 2 will accept interrupts to determine the requirement and decide on the action required. If the action can be handled by the shadow processor alone then it is serviced without reference to the host, but if it does require some intervention by the host, the shadow processor 2 will activate the host processor by way of the host interrupt controller 18.

In the example shown, the shadow processor 2 can service routine requests from the peripherals without the need for host intervention. Data to be processed is shared between the host processor and the shadow processor by way of the register bridge unit 19, in order that the same data can be operated on by both processors.

It will be readily appreciated that, the shadow processor 2 is able to use a subset of the instruction set of the host processor. The main advantage of such a shadow processor is that instruction code can be readily shared between the host and the shadow, without the need for processor emulation or complex code conversion. The other significant advantage is that any work needed to develop the shadow processor can be based on the host processor development work. In addition, the shadow processor design can be optimised, based specifically on the processing of a limited range of instructions of the host processor. Code written for such an application can be analysed to identify the most frequently used instructions, and shadow processors can be provided for those most frequently used instructions. The shadow processor can then be based on the common instruction set but minimum register and addressing range requirements. The shadow processor has access to all the relevant register and memory areas used by the host processor and so the host and shadow processor can work in tandem, the shadow processor performing tasks for which it is designed independently of any reference to the host processor. It will be appreciated that a plurality of shadow processors can be used with a single host processor to provide efficient data processing without the need to refer directly to the host processor itself.

One particular advantage of such system is that the shadow processor can service interrupt requests and other routine tasks without the need to move the host processor into an active state. This can reduce the power consumption of the processing system in total.

It will be appreciated that it is possible to provide all of the functionality of a single host processor by a plurality of shadow processors each dedicated to a single part of that functionality of the host processor. In this way it is possible to produce a processing architecture which does not need to use a host processor as such, but can use a group of shadow processors each of which is optimised for a particular function. Such architectures are illustrated in FIGS. 2 and 3, which show that shadow processors can be arranged to share data and registers so that processing of program steps can have continuity.

Figure 2:
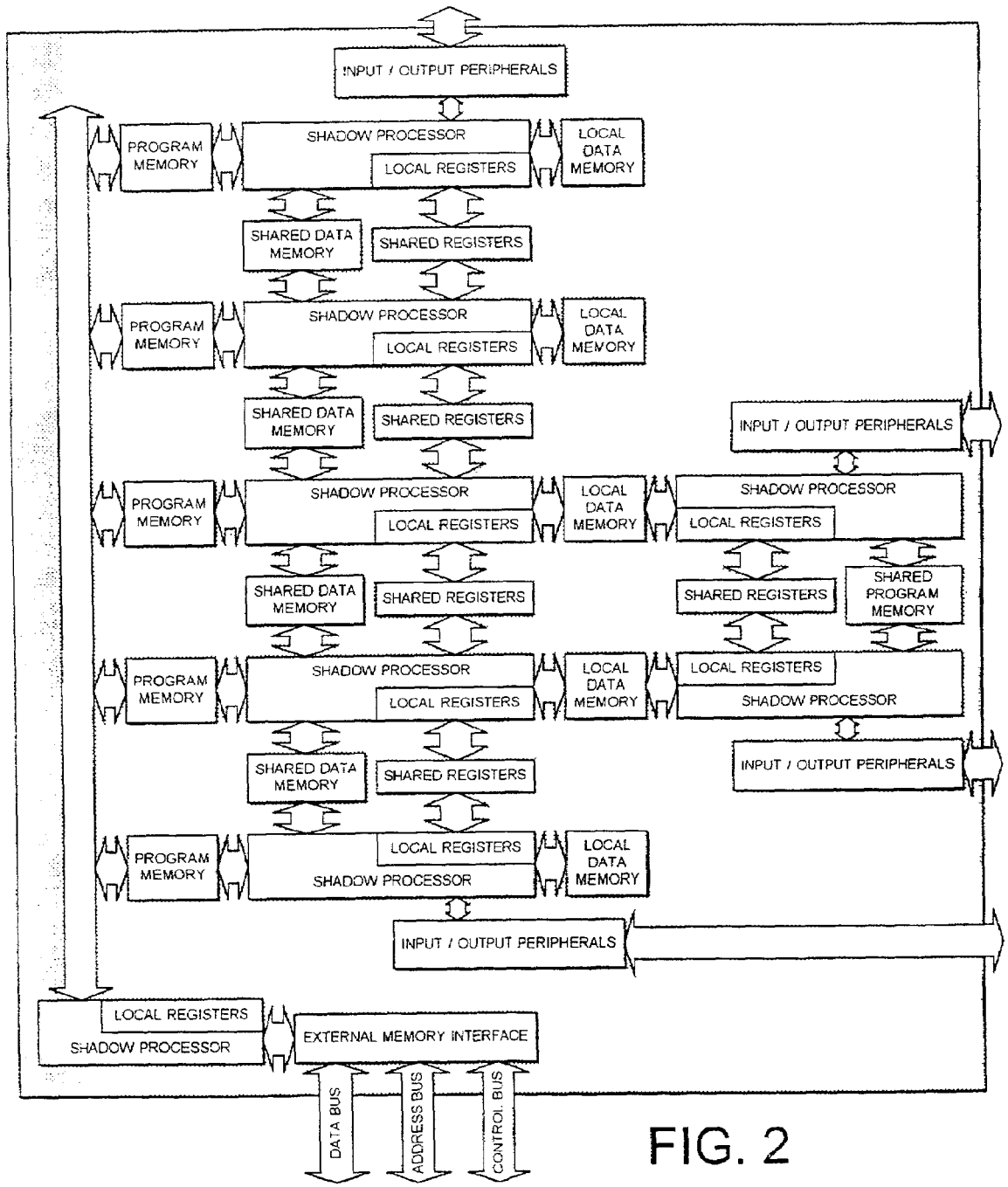
FIG. 2 shows a computer architecture including multiple processors.
Figure 3:
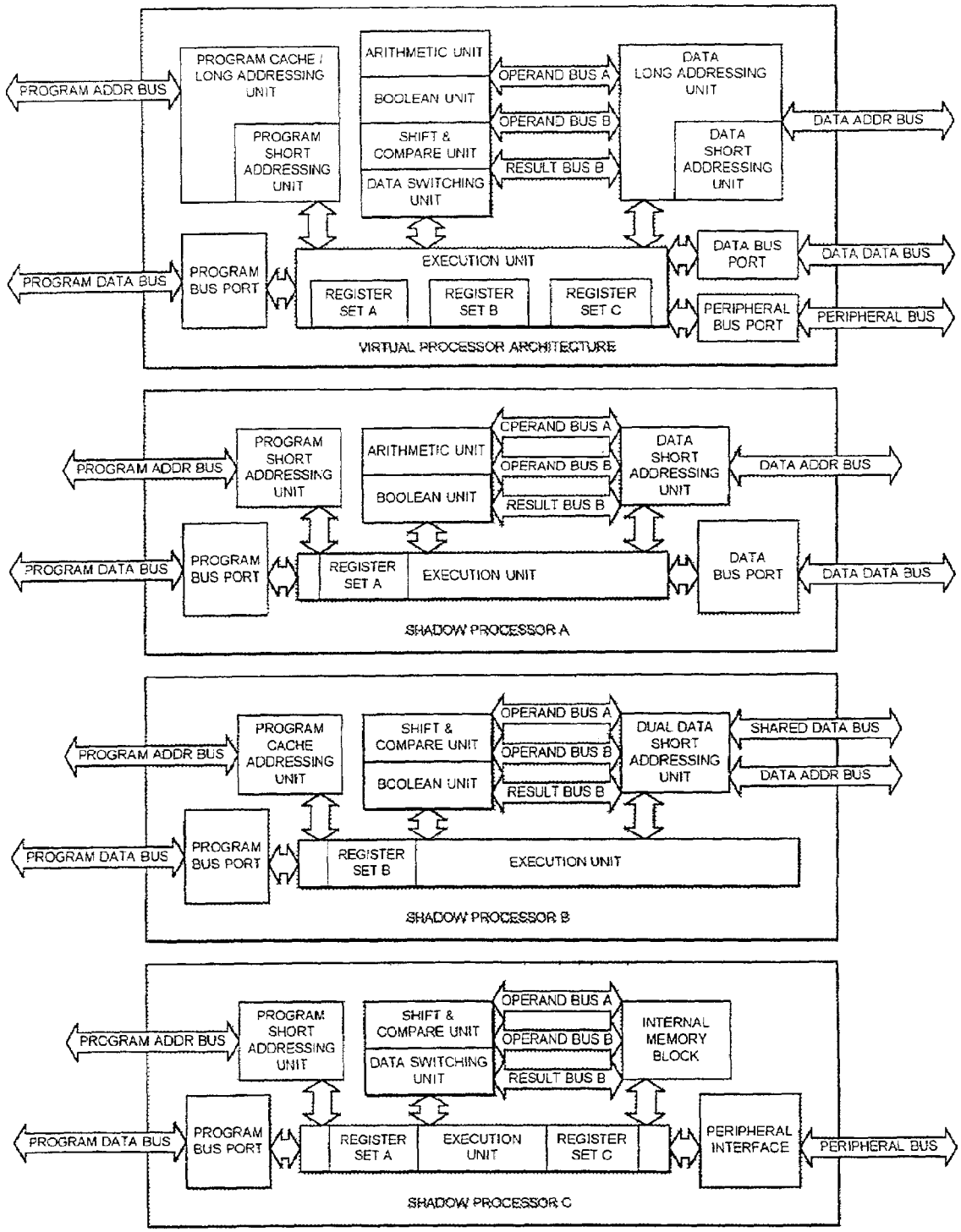
FIG. 3 is a diagramatic illustration of how processors embodying the present invention can realise the functionality of a desired virtual processor.

FIG. 2 is an application of a shadow processor concept without the use of a host processor.

A number of shadow processors are arranged in sequence; each processor performs a particular process on data derived from previous shadow processors and passes the processed data on to the next in the sequence. The sequence has input/output ports on the end shadow processors for connection to other system components. Processing occurs in both directions from shadow processor (i.e. 1 to 5 and 5 to 1). In addition sections 3 and 4 contain two shadow processors (A&B) with additional input/output to be combined with the main sequence. Shadow processor 6 performs the task of memory control and ensures that appropriate code is loaded into the shadow processors from main memory as required. It also performs the main co-ordination task for the system.

An application is of such a configuration could be a telecommunications terminal. The I/O of shadow processor 1 would be attached to the RF subsystem, I/O of processor 5 to the Audio sub-system. The secondary I/O of shadow processors 3b/4b to the data processing, and user interfaces e.g. LCD and keyboard. Each of the shadow processors 1–5 perform specific tasks required such as audio codec, interleaving/de-interleaving, etc.

FIG. 3 is an example of a virtual processor concept.

The main processor is provided as a virtual processor, which may only exist in concept and as a simulation. From this virtual processor various applications are analysed and specific implementations derived. Three such implementations 1–3 are drawn below the Host. Each of the implementations contains specific components of the host required by the applications. For example, Shadow processor A. (1) could be characteristic of a RISC CPU, Shadow processor B (2) could be an example of a logic processor, and Shadow processor C (3) could be an example of a memory management processor.

The important distinction of FIG. 3 is that the host is a virtual processor it may not physically exist.

The shadow processors are optimised fragments of the virtual processor synthesised to a physical implementation on a chip.

The invention claimed is:

1. A computer system, comprising:
   a host processor;
   a shadow processor coupled to the host processor, the shadow processor adapted to control interrupts received from peripherals connected to a computer processor system;
   the host processor in communication with an external bus via an external bus interface, the external bus adapted to transfer data to and from a main processor and at least one memory device;
   a memory controller within the host processor for controlling data access to the at least one memory device;
   an execution unit for controlling the memory controller and the main processor;
   an arithmetic logic unit and a plurality of registers within the host processor;

the memory controller, arithmetic logic unit and registers and host processor being inter-communication via at least one internal bus;

the host processor adapted to process a first set of instructions;

the shadow processor adapted to process a second set of instructions, the second set of instructions being a subset of the first set of instructions; and the shadow processor adapted to receive control signals and to process instructions in dependence upon those control signals independently of the host processor.

2. The computer system of claim 1, further comprising the shadow processor being coupled to the main processor.

3. The computer system of claim 1, adapted to hold the host processor in a low power inactive mode while the shadow processor is processing a second set of instructions.

4. The computer system of claim 1, further comprising an interrupt controller within the shadow processor, adapted to receive interrupt signals via at least one interrupt input.

5. The computer system of claim 4, further comprising the interrupt controller being coupled to at least one peripheral via at least one peripheral bus.

6. The computer system of claim 1, the shadow processor further comprising registers which correspond to selected registers of the host processor.

7. The computer system of claim 6, wherein the shadow processor further includes an execution unit, code memory and data memory.

8. The computer system of claim 7, wherein the shadow processor is adapted to process a selected subset of the instructions from which the host processor operates, and these instructions are stored in the code memory.

9. The computer system of claim 8, wherein the shadow processor is adapted to access to the memory of the host processor by way of a memory controller which interfaces with the external bus by way of the host external bus interface.

10. The computer system of claim 9, further comprising:

a host interrupt controller adapted to couple the host processor execution unit to the shadow processor execution unit;

a register bridged unit adapted to couple the at least one register of the host processor to the at least one register of the shadow processor.

11. The computer system of claim 10, wherein the host interrupt controller is adapted to allow the shadow processor to issue an interrupt to the host processor in order to cause a change in task execution.

12. The computer system of claim 11 wherein the interrupt to the host processor uses a host interrupt protocol and indicates the source of the interrupt as a vector programmed by the shadow process related to the new task required.

* * * * *

UNITED STATES PATENT AND TRADEMARK OFFICE
CERTIFICATE OF CORRECTION

PATENT NO. : 7,197,627 B1
APPLICATION NO. : 09/830719
DATED : March 27, 2007
INVENTOR(S) : Naylor It is certified that error appears in the above-identified patent and that said Letters Patent is hereby corrected as shown below:

Title Page, Item (73), under "Assignee", in Column 1, Line 1, delete "Telefonaktoebolaget" and insert -- Telefonaktiebolaget --, therefor.

Signed and Sealed this

Eighth Day of April, 2008

JON W. DUDAS
*Director of the United States Patent and Trademark Office*